(12) United States Patent
Ito (10) Patent No.: US 12,148,164 B2
(45) Date of Patent: Nov. 19, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hironao Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/203,878

(22) Filed: May 31, 2023

(65) Prior Publication Data

US 2023/0316531 A1 Oct. 5, 2023

Related U.S. Application Data

(63) Continuation of application No. 17/211,925, filed on Mar. 25, 2021, now Pat. No. 11,704,805.

(30) Foreign Application Priority Data

Apr. 1, 2020 (JP) ................. 2020-065788

(51) Int. Cl.
*G06T 7/11* (2017.01)
*G06T 7/194* (2017.01)
(Continued)

(52) U.S. Cl.
CPC ............... *G06T 7/11* (2017.01); *G06T 7/194* (2017.01); *G06T 7/215* (2017.01); *G06V 10/255* (2022.01); *G06V 20/42* (2022.01)

(58) Field of Classification Search
CPC . G06T 7/194; G06T 7/11; G06T 7/215; G06T 2207/10016; G06T 2207/10024;
(Continued)

(56) References Cited

U.S. PATENT DOCUMENTS 11,704,805 B2 7/2023 Yuasa
2008/0012936 A1* 1/2008 White ................... H04N 7/144
348/E7.083
(Continued)

FOREIGN PATENT DOCUMENTS

GB 2596235 A * 12/2021 ............. G03B 15/10
JP H2-71380 A 3/1990
(Continued)

OTHER PUBLICATIONS

Perception-Inspired Background Subtraction—2013 (Year: 2013).*
(Continued)

*Primary Examiner* — Nizar N Sivji
(74) *Attorney, Agent, or Firm* — Carter, DeLuca & Farrell LLP (57) ABSTRACT

An image processing apparatus extracts a foreground image corresponding to an object included in a processing image using a background image corresponding to the processing image, and generates the background image from the processing image. The image processing apparatus determines whether it is allowed to update the background image for use in the extraction, and based on a result of the determination, updates the background image for use in the extraction using the generated background image.

11 Claims, 7 Drawing Sheets

(51) Int. Cl.
  *G06T 7/215* (2017.01)
  *G06V 10/20* (2022.01)
  *G06V 20/40* (2022.01)
(58) Field of Classification Search
  CPC . G06T 2207/30196; G06T 2207/30221; G06T 7/136; G06T 7/174; G06V 10/26; G06V 10/443; G06V 10/255; G06V 20/42
  See application file for complete search history.

(56) References Cited

U.S. PATENT DOCUMENTS

| | | | | |
|---|---|---|---|---|
| 2008/0181507 | A1* | 7/2008 | Gope | G06T 7/194 |
| | | | | 382/284 |
| 2011/0149117 | A1* | 6/2011 | Vendrig | H04N 5/2226 |
| | | | | 348/E5.051 |
| 2011/0216976 | A1* | 9/2011 | Rother | G06T 7/11 |
| | | | | 382/173 |
| 2012/0288153 | A1* | 11/2012 | Tojo | G06T 7/174 |
| | | | | 382/103 |
| 2014/0056473 | A1* | 2/2014 | Tojo | G06T 7/73 |
| | | | | 382/103 |
| 2016/0012599 | A1* | 1/2016 | Kuboyama | H04N 25/772 |
| | | | | 348/348 |
| 2016/0171332 | A1* | 6/2016 | Kawano | G08B 13/19686 |
| | | | | 382/173 |
| 2018/0089523 | A1* | 3/2018 | Itakura | G06T 7/11 |
| 2019/0082160 | A1* | 3/2019 | Yano | G06T 15/205 |
| 2019/0147601 | A1 | 5/2019 | Kakuko | |
| 2019/0236791 | A1* | 8/2019 | Matsui | G06T 7/254 |
| 2020/0020086 | A1* | 1/2020 | Kida | H04N 9/3182 |
| 2020/0228730 | A1* | 7/2020 | Adsumilli | H04N 23/743 |
| 2021/0134058 | A1 | 5/2021 | Ito et al. | |
| 2021/0306616 | A1 | 9/2021 | Ito | |
| 2022/0383603 | A1 | 12/2022 | Ito | |

FOREIGN PATENT DOCUMENTS

| | | |
|---|---|---|
| JP | 2011-211628 A | 10/2011 |
| JP | 2011-258214 A | 12/2011 |
| JP | 2019-091121 A | 6/2019 |
| WO | 2018/056355 A1 | 3/2018 |
| WO | 2018/168552 A1 | 9/2018 |

OTHER PUBLICATIONS

Background Modeling and Foreground Extraction Scheme for HD Traffic Bayonet—2014 (Year: 2014).
Robust Segmentation and Representation of Foreground Key-Regions in Video Sequences—2001 (Year: 2001).
Notice of Reasons for Refusal issued by the Japanese Patent Office on Feb. 20, 2024 in corresponding JP Patent Application No. 2020-065788, with English translation.
Notice of Reasons for Refusal issued by the Japanese Patent Office on May 7, 2024 in corresponding JP Patent Application No. 2020-065788, with English translation.
Noda, Y. et al., "A Robust Method to Detect the Intruded Objects Under the Varying Illumination Based on the Background Subtraction" IPSJ SIG Technical Reports (Mar. 2008) pp. 513-518, vol. 2008 No. 27, with English translation.
Makarov, A., "Comparison of background extraction based intrusion detection algorithms" Proceedings of 3rd IEEE International Conference on Image Processing (Sep. 1996) pp. 521-524.

* cited by examiner

IMAGE PROCESSING APPARATUS, IMAGE PROCESSING METHOD, AND STORAGE MEDIUM

CROSS REFERENCE TO RELATED APPLICATIONS

This application is a continuation of U.S. patent application Ser. No. 17/211,925, filed on Mar. 25, 2021, which claims the benefit of and priority to Japanese Patent Application No. 2020-065788, filed Apr. 1, 2020, each of which is hereby incorporated by reference herein in their entirety.

BACKGROUND

Field

The technique of the present disclosure relates to a technique for extracting a foreground from a processing image.

Description of the Related Art

There are a variety of image processing apparatuses that analyze a captured image (a processing image) obtained by capturing by a captured apparatus and extract a foreground from the processing image. Depending on a detection unit or a capturing scene, an image processing apparatus may erroneously detect what is not a foreground or fail to detect a foreground despite the fact that there is one. International Publication No. 2018/056355 discloses a method for preventing erroneous detection of an immobile object placed in front of a camera by detecting a change in an object in an image and extracting an immobility region.

SUMMARY

However, with International Publication No. 2018/056355, it is difficult to detect a person or an object as a foreground in a scene where, for example, the person or object is motionless even for a short period of time. In background differencing, a region where there is no motion for a certain period of time is determined as a background region, and an image corresponding to the background region is used to update a background image used in the extraction of a foreground from a processing image. In a case where a person as an object is motionless for a certain period of time or moving to a degree such that the object is not extractable as a foreground, no detection or erroneous detection occurs, and a region corresponding to the person cannot be properly extracted from a processing image as a foreground.

The technique of the present disclosure provides a technique for properly extracting a foreground from an image.

An image processing apparatus according to an aspect of the technique of the present disclosure comprises: one or more memories storing instructions; and one or more processors executing the instructions to: extract a foreground image corresponding to an object included in a processing image using a background image corresponding to the processing image; generate the background image from the processing image; determine whether it is allowed to update the background image for use in the extraction; and based on a result of the determination, update the background image for use in the extraction using the generated background image.

Further features of the present disclosure will become apparent from the following description of exemplary embodiments with reference to the attached drawings.

DESCRIPTION OF THE EMBODIMENTS

Hereinafter, embodiments of the present disclosure are described with reference to the drawings. It should be noted that the following embodiments are not intended to limit the present disclosure, and not all the combinations of features described in the embodiments are necessarily essential to the solving means of the present disclosure.

Embodiment 1

Using FIGS. 1 to 4, a description is given on an image processing apparatus according to the present embodiment. In the present embodiment, a description is given on the image processing apparatus that compares an input image (a processing image) with a background image (also referred to simply as a background) to extract a foreground (also referred to simply as a foreground image) from the input image, and based on a user operation, can configure settings as to whether to allow a background image update and as to the timing to update the background image.

(Software Configuration of the Image Processing Apparatus)

Figure 1:
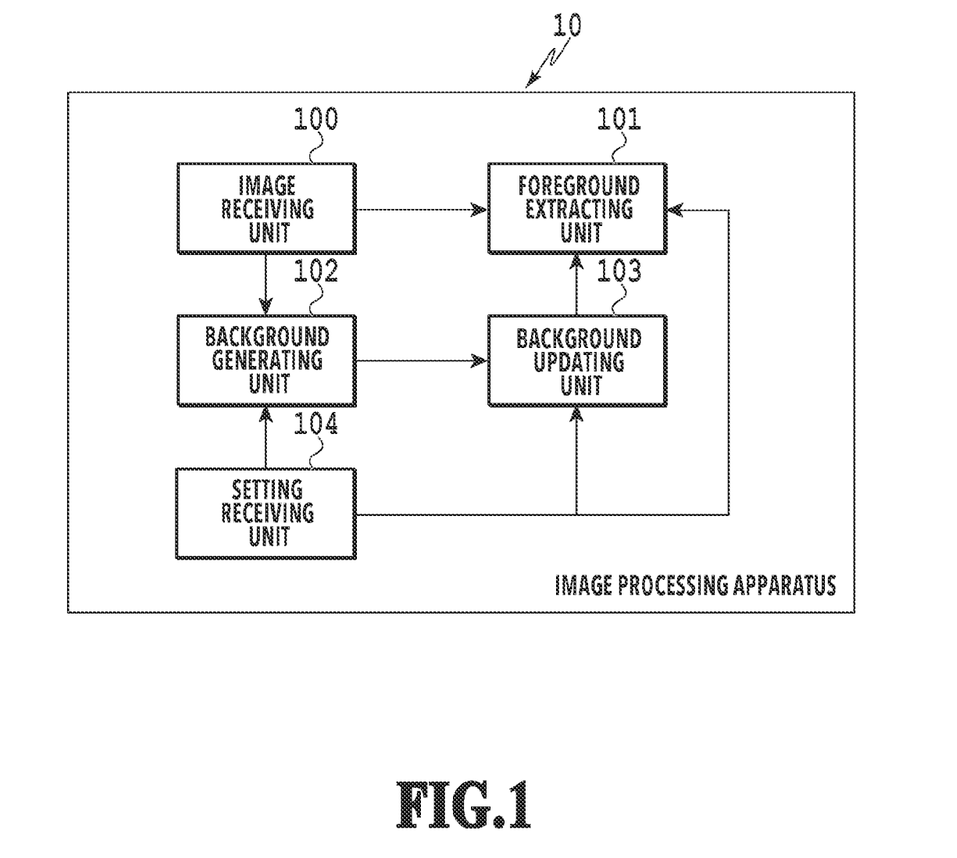
FIG. 1 is a diagram showing an example functional configuration of an image processing apparatus.

FIG. 1 is a diagram showing an example functional configuration of the image processing apparatus of the present embodiment. An image processing apparatus 10 of the present embodiment can function as an apparatus that generates a foreground and a background image separately from an input image. The image processing apparatus 10 has an image receiving unit 100, a foreground extracting unit 101, a background generating unit 102, a background updating unit 103, and a setting receiving unit 104.

The image receiving unit 100 receives (obtains) an image captured by a captured apparatus (an input image). The image receiving unit 100 may obtain the input image directly from the captured apparatus or from the image processing apparatus or an external apparatus connected to the image processing apparatus which stores the input image. The input image received by the image receiving unit 100 is outputted to the foreground extracting unit 101 and the background generating unit 102.

The foreground extracting unit 101 compares the input image with a background image generated based on the input image and extracts a foreground from the input image based on the comparison results. The background image is an image generated by the background generating unit 102 and is inputted via the background updating unit 103. The input image is an image inputted from the image receiving unit 100. There are various ways to compare a background image and an input image with each other. For example, pixels in an input image whose RGB values are different from those in a background image by a threshold (a foreground extraction threshold) or greater may be extracted from the input image as a foreground. Any other image comparing method may be used instead.

The background generating unit 102 determines motionless pixels as a background based on input images of a plurality of frames and thereby generates an image formed by the motionless pixels as a background image. The number of the plurality of frames is not limited as long as they allow pixel values of the same pixel to be compared, and is, for example, 2 or greater. A motionless pixel may be, for example, a pixel whose pixel values in the respective input images of the plurality of frames are the same or different by a threshold (background generation threshold) or below. The background generation threshold is smaller than the foreground extraction threshold.

Figure 4:
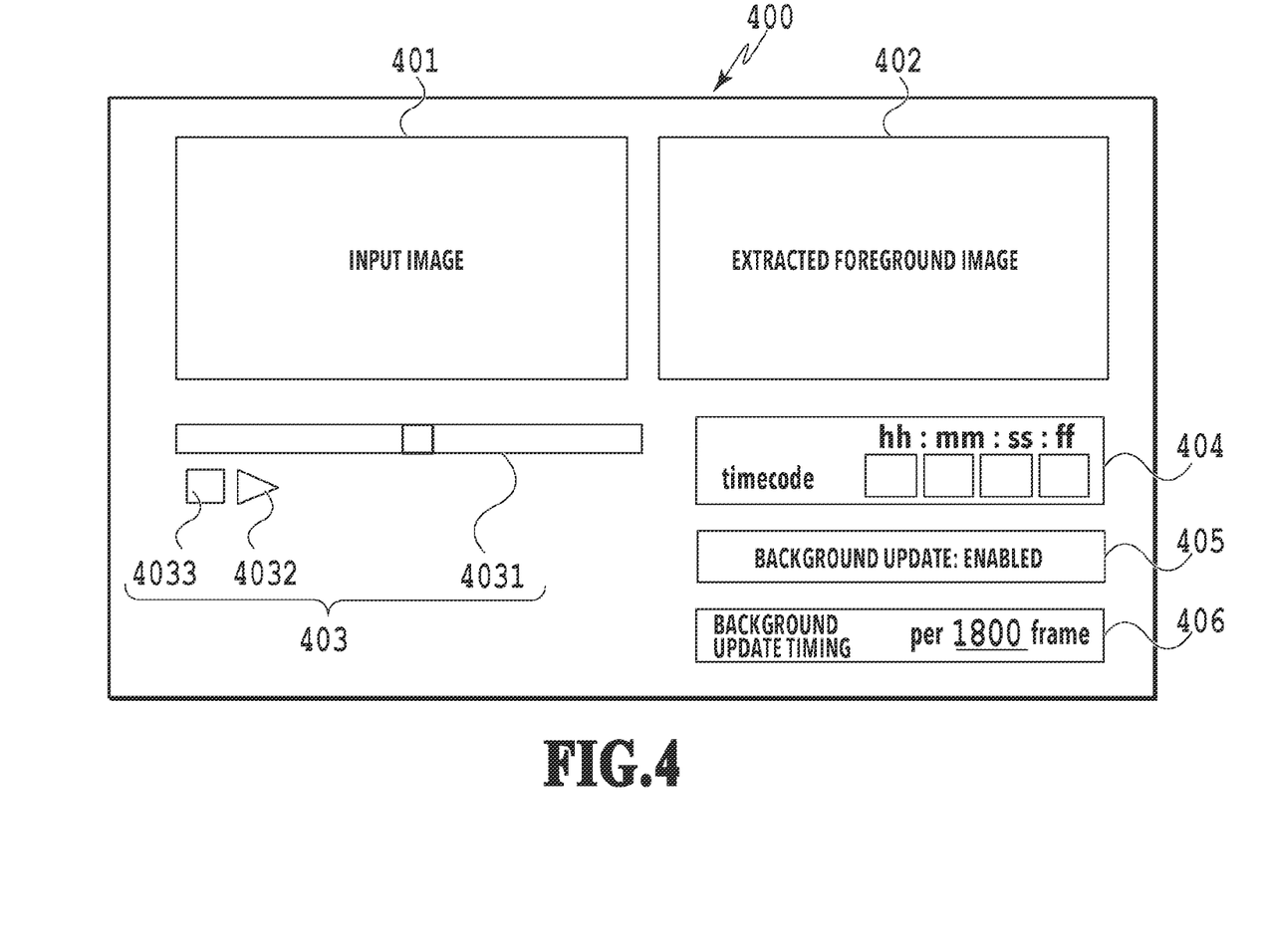
FIG. 4 is a diagram showing an example UI screen.

The background updating unit 103 controls, based on a setting in the setting receiving unit 104, whether it is allowed to update the background image to use for the foreground extraction processing performed by the foreground extracting unit 101 with the background image generated by the background generating unit 102. The setting in the setting receiving unit 104 is configured by a user operation. In the present embodiment, the background updating unit 103 has a function to control whether to enable or disable (allow or not allow) update of the background image and a function to control the timing to update the background image. In a case where a background image update control button 405 on an UI screen 400 to be described later is enabled, the background updating unit 103 determines that the update of the background image is allowed, and thus outputs, to the foreground extracting unit 101, the background image generated by and inputted from the background generating unit 102. In a case where the background image update control button 405 on the UI screen 400 is disabled, the background updating unit 103 determines that the update of the background image is not allowed, and thus skips outputting of the background image generated by and inputted from the background generating unit 102 to the foreground extracting unit 101.

The setting receiving unit 104 receives various settings of the image processing apparatus 10 that performs foreground-background separating processing, and according to the various settings received, applies the settings to the foreground extracting unit 101, the background generating unit 102, and the background updating unit 103. The various settings include the foreground extraction threshold, the background generation threshold, the timing to update the background image, and whether to allow a background image update. For example, the setting receiving unit 104 receives the various settings of the image processing apparatus 10 configured by a user operation, via the UI screen 400 to be described later.

(Internal Configuration of the Background Generation Unit)

Figure 2:
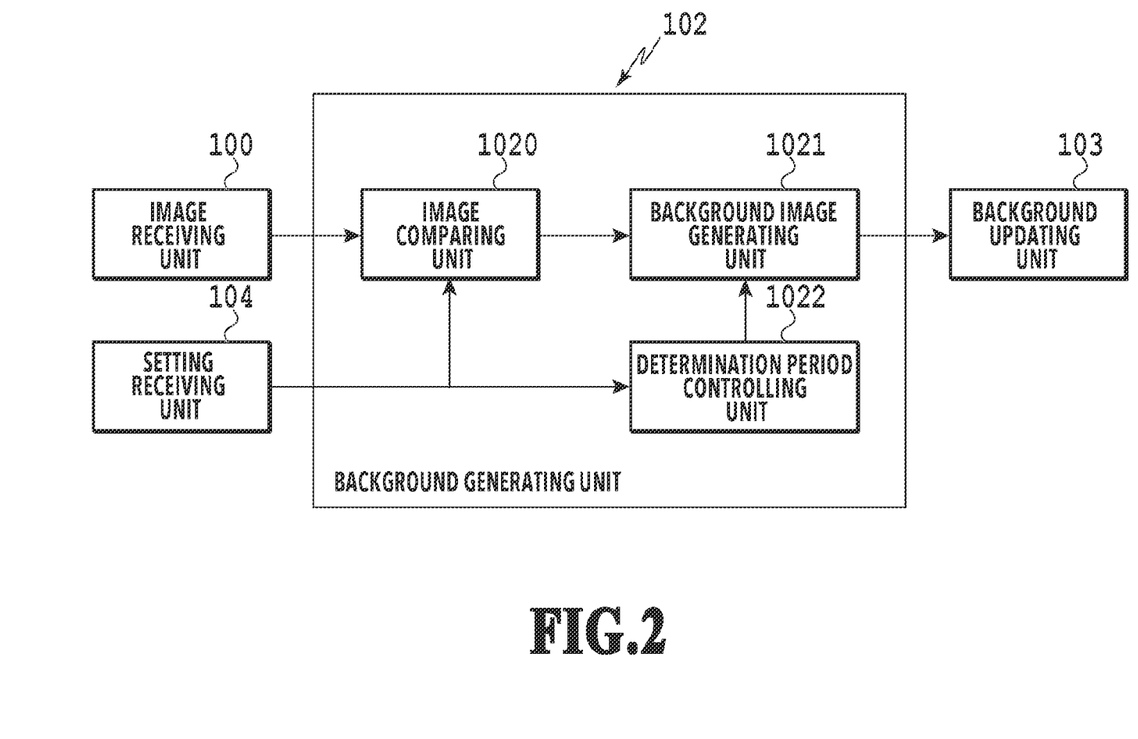
FIG. 2 is a diagram showing the internal configuration of a background generating unit.

FIG. 2 is a diagram showing the internal configuration of the background generating unit 102. The background generating unit 102 has an image comparing unit 1020, a background image generating unit 1021, and a determination period controlling unit 1022.

The image comparing unit 1020 compares the current input image with a past input image, and based on the comparison results, determines whether there is motion between the pixels. There are various methods for the comparison. For example, the image comparing unit 1020 may make the determination based on whether RGB values of a pixel in the current input image are each different from those in the past input image by a threshold or greater. Specifically, the image comparing unit 1020 determines that a pixel has motion in a case where its RGB values are each different from those of the corresponding pixel by the threshold or greater, and determines that a pixel has no motion in a case where its RGB values are each different from those of the corresponding pixel by less than the threshold. Any other method may be used instead as long as it is used for determining image differences. The past input image is an input image held in the image comparing unit 1020, and may be any input image as long as it is of a frame before the current input image at the time of the comparison. The past input image may be one of the immediately preceding frame, or one of a plurality of frames back. The results of the determination by the image comparing unit 1020 are outputted to the background image generating unit 1021.

The background image generating unit 1021 generates a background image based on the determination results from the image comparing unit 1020, and holds the background image. For each pixel determined by the image comparing unit 1020 as having no motion, the background image generating unit 1021 updates (replaces) the pixel value in the background image held in the background image generating unit 1021 with the pixel value in the input image. The generation of a background image may use comparison results on an input image of a single frame or on input images of a plurality of frames. Using comparison results on input images of a plurality of frames for the generation of a background image allows stable background detection. The number of frames of the input images compared for the generation of a background image can be controlled according to the setting configured by the determination period controlling unit 1022. The present embodiment uses comparison results on input images of frames as many as the number set by the determination period controlling unit 1022 and determines that a pixel has no motion in a case where the difference between the pixel values is equal to or below the threshold in all the frames.

The determination period controlling unit 1022, as described earlier, controls the number of frames used for the determination of a background image.

(Image Processing)

Figure 3:
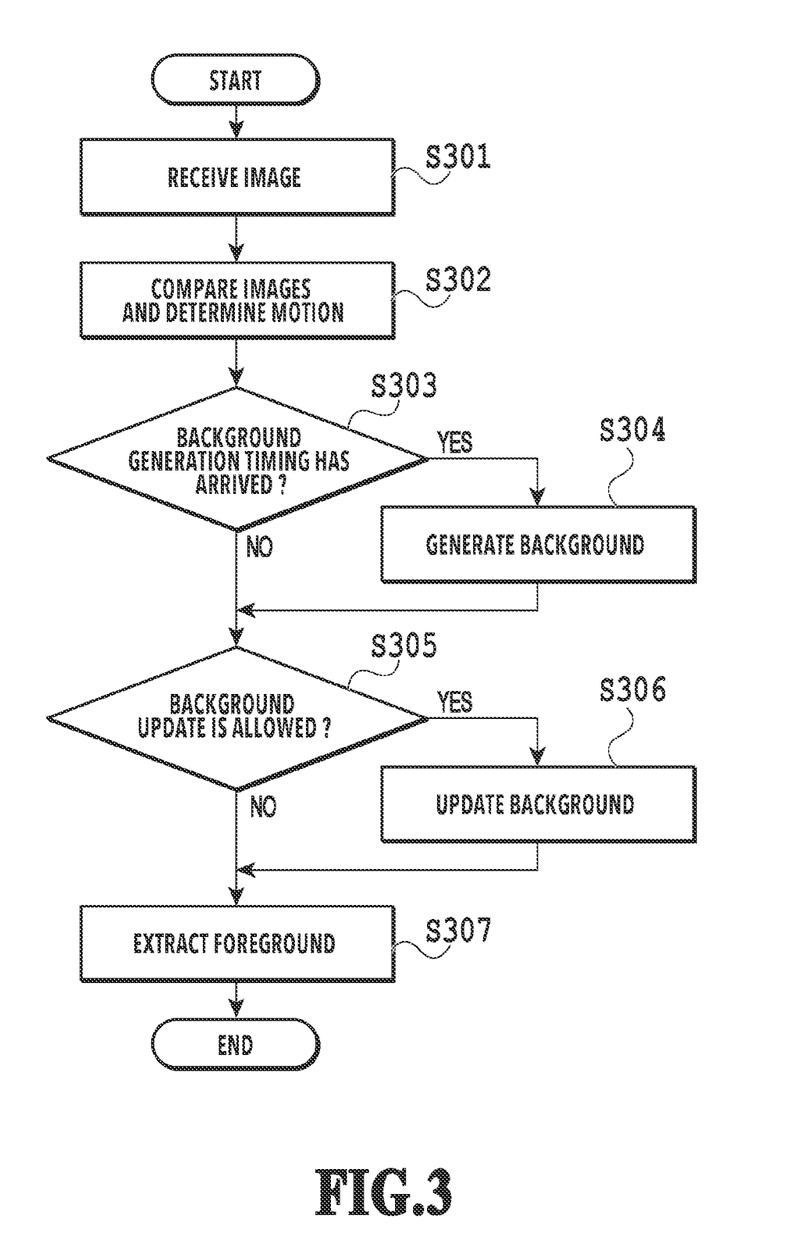
FIG. 3 is a flowchart showing how image processing is performed.

FIG. 3 is a flowchart showing how the image processing apparatus 10 performs image processing (foreground-background separating processing). This flowchart shows processing to receive an input image of one frame, generate and update a background image according to the settings, and extract a foreground. It is assumed here that the past input image used in the processing in S302 to be described later and the background image used in the processing in S307 are held in the image processing apparatus 10. In other words, it is assumed that the image processing apparatus 10 has already generated a background image, the image comparing unit 1020 holds a past input image to use for comparison, the background image generating unit 1021 holds the background image, and the foreground extracting unit 101 holds the background image. In the present embodiment, whether to allow a background image update can be set by a user operation, and whether to allow a background image update is set depending on a scene. A setting is configured not to allow a background image update in a case where an object (person) is motionless for a certain period of time or moving to a degree such that the object is not extractable as a foreground. In sports, there are various scenes where a setting is configured not to allow a background image update. For instance, in soccer, a player's taking a free kick is a scene where a person is motionless for a certain period of time. In rugby, a scene where players scrum is a scene where people are motionless for a certain period of time. Further, a scene where an injured player is cared for is a scene where a person is suddenly motionless for a certain period of time. Additionally, a foreground may be extracted by execution of the present processing on each of the input images of successive frames. The letter "S" in the following description of the flowchart denotes Step. This applies to the description of the other flowchart as well.

In S301, the image receiving unit 100 receives an input image and transmits the received input image to the foreground extracting unit 101 and the background generating unit 102 (or the image comparing unit 1020 of the background generating unit 102).

In S302, the image comparing unit 1020 compares the input image transmitted from the image receiving unit 100 to the background generating unit 102 (the current input image) with the past input image held in the image comparing unit 1020 (a stored image), and based on the comparison results, determines pixels that has no motion. For example, the comparison is performed as follows. A corresponding pixel in the input image and the stored image is determined as having motion in a case where the pixel values of the corresponding pixel have a difference equal to or greater than a threshold, and is determined as having no motion in a case the pixel values of the corresponding pixel have a difference less than the threshold. The determination results obtained by the image comparing unit 1020 are sent to the background image generating unit 1021 of the background generating unit 102.

In S303, the background image generating unit 1021 determines whether the timing set by the determination period controlling unit 1022 to generate a background image has arrived. For the determination of the timing to generate a background image, the timing set in a background image update timing specification window is used. For example, assume that the setting in the background image update timing specification window indicates every 1800 frames. In a case where the input image received in S301 is a frame of a multiple of 1800 such as the 1800th frame, the background image generating unit 1021 determines that the background image generation timing has arrived. In a case where the input image received in S301 is a frame of not a multiple of 1800 such as the 1801st frame, the background image generating unit 1021 determines that the background image generation timing has not arrived. In a case where the background image generating unit 1021 determines that the background image generation timing has arrived (YES in S303), the processing proceeds to S304. In a case where the background image generating unit 1021 determines that the background image generation timing has not arrived (NO in S303), the processing proceeds to S305.

In S304, based on the results of comparison using the input images of a plurality of frames, the background image generating unit 1021 generates a background image by replacing the pixel value of each pixel in the current background image determined as having no motion with the pixel value in the current input image. The number of input image frames used for the determination is determined by the number set by the determination period controlling unit 1022. Then, the background image generating unit 1021 transmits the generated background image to the background updating unit 103. After the background image generating unit 1021 transmits the background image, the processing proceeds to S305.

In S305, the background updating unit 103 determines whether a background image update is allowed. Whether a background image update is allowed is set by, for example, a user operation on the UI screen 400 to be described later. In a case where the background updating unit 103 determines that a background image update is not allowed (NO in S305), the processing skips S306 and proceeds to S307. In a case where the background updating unit 103 determines that a background image update is allowed (YES in S305), the processing proceeds to S306.

In S306, the background updating unit 103 transmits the background image to the foreground extracting unit 101. The foreground extracting unit 101 receives the background image transmitted from the background updating unit 103, and updates the background image for foreground extraction pixel by pixel based on the background image received. It can also be said that the background image to be used by the foreground extracting unit 101 to extract a foreground is updated by the background updating unit 103 pixel by pixel with the background image transmitted from the background updating unit 103.

It is assumed here that the function to control whether or not to allow a background image update and the function to control the timing to update the background image are set in advance by the setting receiving unit 104 before the processing shown in FIG. 3 is executed. In a case where the settings of the above functions are changed while the processing shown in FIG. 3 is in execution and in operation, the changed settings are applied to the processing performed on an input image of the next frame.

In S307, the foreground extracting unit 101 compares the input image with the background image and extracts a foreground from the input image based on the differences between the input image and the background image.

In a case where there is an input image of the next frame after the execution of the foreground extraction processing, the processing returns to S301 to repeat the processing from S301 to S307. In a case where there is no input image of the next frame, the processing shown in FIG. 3 ends.

(UI Screen)

FIG. 4 is a diagram showing an example of the UI screen 400 through which the setting receiving unit 104 sets the functions of the background updating unit 103. The UI screen 400 is displayed on a display unit 706 to be described in detail later and receives a user operation.

The UI screen 400 includes an input image window 401, an extracted foreground image window 402, operation buttons 403, a processing frame's time code display part 404, the background image update control button 405, and a background image update timing specification window 406. The arrangement of these, the shapes of the buttons, and the like are not limited to the above.

The input image window 401 is an area where the input image received by the image receiving unit 100 is displayed. The input image displayed in the input image window 401 is one of the processing frame corresponding to the time indicated by the position of the slider of a seek bar 4031 and the time displayed in the time code display part 404.

The extracted foreground image window 402 is an area where a foreground is displayed, the foreground corresponding to the input image of the processing frame being displayed in the input image window 401 and having been extracted from the input image of the processing frame by the foreground extracting unit 101.

The operation buttons 403 include the seek bar 4031, a play button 4032, and a stop button 4033. Once the play button 4032 is pressed by a user operation, the foreground extracting processing is started, and in response to that, the slider bar of the seek bar 4031 moves on the bar, and the processing frame displayed in the input image window 401 advances accordingly. The time code displayed in the time code display part 404 also advances. Once the stop button 4033 is pressed by a user operation, the foreground extraction processing is stopped. Consequently, the slider of the seek bar 4031 stops on the bar, and the processing frame displayed in the input image window 401 also stops. The time code displayed in the time code display part 404 also stops.

In the time code display part 404, the time code of the frame being processed is displayed.

The background image update control button 405 can configure a setting for "enabling" (allowing) a background image update or "disabling" (not allowing) a background image update. In a case where a background image update is disabled, it is determined in S305 in FIG. 3 that a background image update is not allowed. In a case where a background image update is enabled, it is determined in S305 in FIG. 3 that a background image update is allowed.

The timing set in the background image update timing specification window 406 is used for the determination in S303. For example, in a case "1800" is specified, a background image update is performed every 1800 frames (once in every 30 seconds in a case of processing a 60-fps video).

According to the present embodiment described above, whether to allow a background image update and the timing to update the background image can be controlled (set), and therefore, a foreground can be properly extracted from a processing image irrespective of the state of the object. More specifically, even in a case where an object such as a person is motionless for a certain period of time or is moving to a degree such that the object is not extractable as a foreground, erroneous foreground detection where a foreground including the object is contained in the background image or no detection where a foreground including the object is not detected can be prevented.

Although the timing to generate a background image and whether to allow a background image update are determined separately in the present embodiment, the present disclosure is not limited to this. The background image may be updated only in the event that a background image is generated.

Also, although the timing to update the background image is manually entered (set) in the present embodiment, the present disclosure is not limited to this. An initial value indicative of the timing to update the background image may be set automatically for each sport or image capturing target, and a recommended value indicative of the timing to update the background image may be set or displayed based on temporally changing conditions such as lighting and weather.

Embodiment 2

In the present embodiment, a description is given on a mode where whether to allow a background image update is determined according to the state of a foreground and the state of the background image generated.

(Software Configuration of the Image Processing Apparatus)

Figure 5:
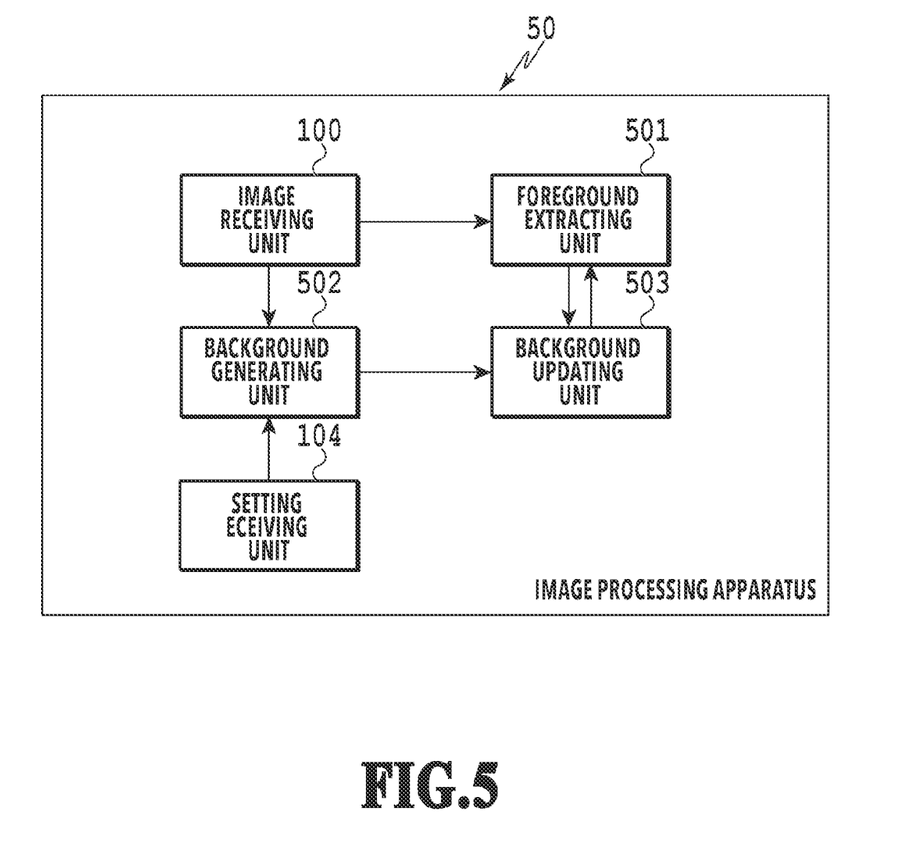
FIG. 5 is a diagram showing an example functional configuration of an image processing apparatus.

FIG. 5 is a diagram showing an example functional configuration of an image processing apparatus of the present embodiment. Like that of the first embodiment, an image processing apparatus 50 of the present embodiment can function as an apparatus that separates and generates a foreground and a background image from an input image (a processing image). Configurations and processing that are the same as those in the first embodiment described above are denoted by the same reference numerals as those used in the first embodiment and are not described here. The following description mainly focuses on the differences.

The image processing apparatus 50 has the image receiving unit 100, the setting receiving unit 104, a foreground extracting unit 501, a background generating unit 502, and a background updating unit 503.

The foreground extracting unit 501 performs the following operations in addition to those performed by the foreground extracting unit 101 of the first embodiment: deriving the percentage of a foreground extracted from an input image and outputting the thus-derived foreground percentage to the background updating unit 503. In other words, the foreground extracting unit 501 not only extracts a foreground from an input image, but also derives the percentage of the foreground and outputs the percentage of the foreground to the background updating unit 503. The foreground percentage is the proportion of the foreground to the input image.

The background generating unit 502 performs the following operations in addition to those performed by the background generating unit 102 of the first embodiment: outputting the percentage of the pixels determined as a background image (also referred to as a background percentage) to the background updating unit 503. The background percentage is the proportion of the pixels in the input image that are determined as a background by a comparison with a past background image.

Based on the percentage of the foreground and the percentage of the pixels determined as a background image (a background), the background updating unit 503 determines whether the state of the foreground and the state of the background are normal, and updates or does not update the background image depending on the determination results. In the present embodiment, in a case where the percentage of a foreground is higher than a predetermined first threshold and hence the state of the foreground is determined as being abnormal, the background image is not updated. Also, in a case where the percentage of the pixels determined as a background image is lower than a predetermined second threshold and hence the state of the background image is determined as abnormal (there are many pixels with motion), the background image is not updated. The first threshold and the second threshold may be set in advance or may be set through the setting receiving unit 104. Then, in a situation (a scene) where there are many moving foregrounds in an input image (screen), it is determined that the accuracy as a background image is low, and a setting can be configured not to execute a background image update. In a case where the state of the foreground is determined as normal because the percentage of the foreground is lower than the first threshold and the state of the background image is determined as normal because the percentage of the pixels determined as the background image is higher than the second threshold (there are a small number of moving pixels), the background image is updated. Then, in a situation (a scene) where there are a small number of moving foregrounds in an input image (screen), it is determined that the accuracy as a background image is high, and a setting can be configured to execute a background image update. The first threshold may be, for example, 50%. The second threshold may be, for example, 50%.

Although a comparison method using thresholds is described herein, the present disclosure is not limited to this. Alternatively, the determination may be made according to the state of a portion of the foreground or the background image to be updated. For example, in a case where many small foregrounds are present over the entire input image (screen), it may be determined that there is too much noise, and a background image update may be stopped. In a case where an update portion of the background image is a lump region of a certain size, it is possible to determine the object as not the grass in soccer or the like, but a flag spread on the field, and to determine to stop a background image update. Also, instead of the comparison using the thresholds, the comparison may use an average value over a certain period of time. Then, in a case where the percentage of a foreground or the percentage of the pixels determined as a background image is largely different from the average value of a certain period of time, it may be determined not to update the background image. The determination to stop a background image update is not limited to this. The determination to stop a background image update may be made based on the state of the foreground or the background image.

(Image Processing)

Figure 6:
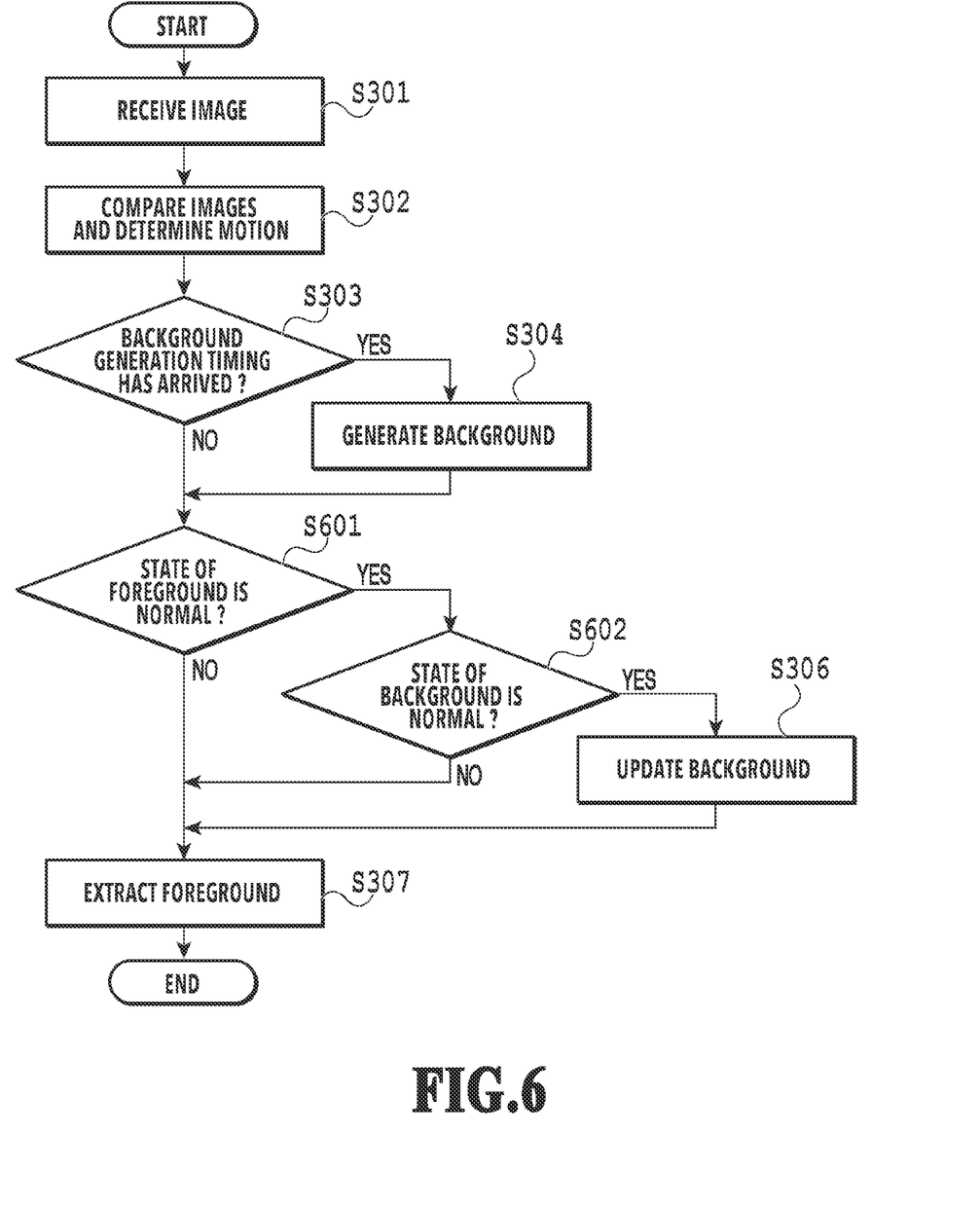
FIG. 6 is a flowchart showing how image processing is performed.

FIG. 6 is a flowchart showing how the image processing apparatus 50 performs image processing (foreground-background separating processing). The determination processing in S601 and S602 is what is different from the first embodiment. In a case where determining that the background image generation timing has not arrived yet in S303 (NO in S303), or after the background image generation processing in S304 ends, the processing proceeds to S601. It is assumed here that the percentage of the foreground used in the processing in S601 and the percentage of the pixels determined as a background image used in the processing in S602 are held in the image processing apparatus 50. In other words, the image processing apparatus 50 has already generated a background image, and the background updating unit 503 holds the percentage of the foreground and the percentage of the pixels determined as the background image.

In S601, the background updating unit 503 determines whether the state of the foreground is normal. For example, the background updating unit 503 first compares the percentage of the foreground inputted from the foreground extracting unit 501 with the first threshold. The percentage of the foreground may be one derived in the previous foreground extraction processing. Then, in a case where the percentage of the foreground is lower than the first threshold as a result of the comparison, the background updating unit 503 determines that the state of the foreground is normal (YES in S601), and the processing proceeds to S602. In a case where the percentage of the foreground is higher than the first threshold as a result of the comparison, the background updating unit 503 determines that the state of the foreground is abnormal (NO in S601), and the processing skips S306 and proceeds to S307.

In S602, the background updating unit 503 determines whether the state of the background image is normal. For example, the background updating unit 503 first compares the percentage of the pixels determined as a background image with the second threshold, the percentage being inputted from the background generating unit 502. The percentage of the pixels determined as a background image may be the pixels determined as a background image derived by the previous background generation processing. Then, in a case where the percentage of the pixels determined as a background image is higher than the second threshold as a result of the comparison, the background updating unit 503 determines that the state of the background image is normal (YES in S602), and the processing proceeds to S306. In a case where the percentage of the pixels determined as a background image is lower than the second threshold as a result of the comparison, the background updating unit 503 determines that the state of the background is abnormal (NO in S602), and the processing proceeds to S307.

In the flowchart described above, the background image is updated in a case where the state of the foreground and the state of the background image are both determined as normal. However, the present disclosure is not limited to such processing. The background image may be updated in a case where only one of the state of the foreground and the state of the background image is determined as normal. The state of the foreground and the state of the background image may be each weighted, and a comprehensive value thereof may be used to determine whether to update the background image. Specifically, the determination may be made as follows: in a case where the comprehensive value is larger than a given value, the background image is not updated because the proportion of the foreground is large, and in a case where the comprehensive value is smaller than the given value, the background image is updated because the proportion of the foreground is small.

As described thus far, the present embodiment can automatically determine, without a user operation, whether to execute a background image update based on the states of a foreground and a background image and consequently allows the foreground to be extracted properly from an input image. In other words, for example, the following processing is possible. In a case where an input image includes many foregrounds, it is determined that the accuracy as a background image is low, and the background image is not updated.

(Hardware Configuration of the Image Processing Apparatus)

Figure 7:
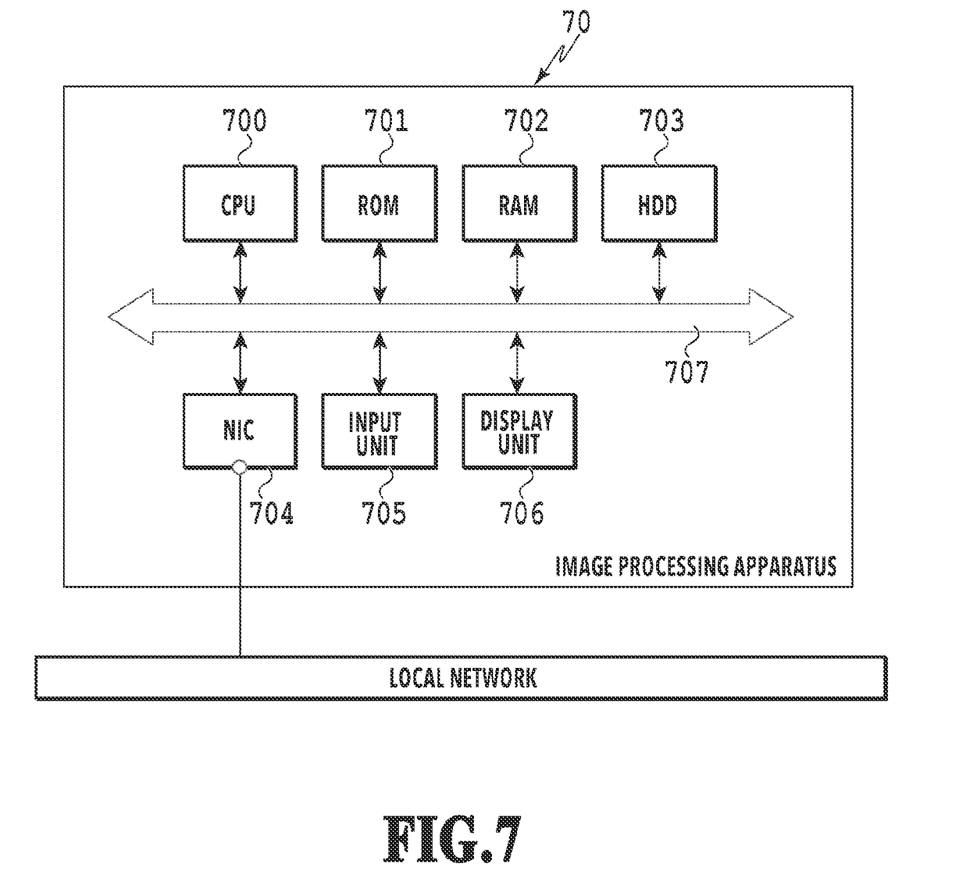
FIG. 7 is a diagram showing an example hardware configuration of an image processing apparatus.

FIG. 7 is a diagram showing an example hardware configuration of an image processing apparatus 70. The hardware configuration of the image processing apparatus 70 shown in FIG. 7 implements the software functional configuration shown in FIG. 1 or 5. The image processing apparatus 70 is a computer and has a central processing unit (CPU) 700, a read-only memory (ROM) 701, a random-access memory (RAM) 702, a hard disk drive (HDD) 703, a network interface card (NIC) 704, an input unit 705, and the display unit 706.

The CPU 700 performs overall control of the computer using the computer program and data stored in the ROM 701 and the RAM 702 and causes the image processing apparatuses of the above-described embodiments to perform the processing described above. The CPU 700 functions as each of the processors shown in FIG. 1 or 5. Stored in the ROM 701 are configuration data on the computer, the boot program, and the like. The RAM 702 has an area to temporarily store the computer program or data loaded from the HDD 703, data obtained from the outside via the NIC 704, and the like. The RAM 702 also has a work area for the CPU 700 to use in executing various kinds of processing. In other words, the RAM 702 can, for example, allocate an area as a frame memory and provide other various areas as needed.

The input unit 705 is formed by a keyboard, a mouse, and/or the like, and by being operated by a user of the computer, can input various kinds of instructions to the CPU 700. The display unit 706 is formed by, for example, a liquid crystal display and displays results of processing by the CPU 700. The HDD 703 is a large-capacity information storage apparatus. Stored in the HDD 703 are the operating system (OS) and the computer program for causing the CPU 700 to implement the functions of the units shown in FIG. 1 or 5. Image data to be processed may also be stored in the HDD 703. As controlled by the CPU 700, the computer program and data stored in the HDD 703 are loaded to the RAM 702 and processed by the CPU 700 as needed. The NIC 704 allows a connection to other devices such as a network like a LAN or the Internet, a projector, or a display, and this computer can obtain or send various kinds of information through the NIC 704. A system bus 707 is a bus linking the above-described units in such a way that data can be transmitted and received among them.

With the configuration described above, the operations described in the above embodiments are controlled mainly by the CPU 700.

The objective of the present disclosure may be achieved also by supplying a system with a storage medium in which codes of the computer program implementing the functions described above are recorded to cause the system to read and execute the codes of the computer program. In this case, the codes of the computer program read from the storage medium themselves implement the functions of the embodiments described above, and the storage medium storing the codes of the computer program forms the present disclosure. The present disclosure also includes the following mode. Specifically, the OS running on the computer or the like performs part or all of the actual processing based on the instructions of the codes of the program to implement the functions described above.

The present disclosure may also include the following mode. Specifically, the codes of the computer program read from a storage medium are written to a memory in a function expansion card inserted into the computer or in a function expansion unit connected to the computer. Then, based on the instructions of the codes of the computer program, a CPU or the like in the function expansion card or the function expansion unit may perform part or all of the actual processing to implement the functions described above.

In a case where the present disclosure is applied to the above storage medium, the codes of the computer program corresponding to the processing described above are stored in the storage medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The present embodiments allow a foreground to be properly extracted from an image.

This application claims the benefit of Japanese Patent Application No. 2020-065788, filed Apr. 1, 2020, which is hereby incorporated by reference wherein in its entirety.

What is claimed is:

1. An image processing apparatus comprising:
one or more memories storing instructions; and
one or more processors executing the instructions to:
extract a foreground image corresponding to an object included in a processing image using a background image corresponding to the processing image;
generate a background image from the processing image;
receive a user operation to set as to whether to update the background image for use in the extraction from a user interface;
update, for each of a predetermined plurality of frames, the background image for use in the extraction using the generated background image and not to update the background image for use in the extraction at frames not corresponding to the predetermined plurality of frames; and
stop updating the background image for use in the extraction in a case where the background image for use in the extraction is set not to be updated by the received user operation.

2. The image processing apparatus according to claim 1, wherein
the predetermined plurality of frames are set based on the user operation received from the user interface.

3. The image processing apparatus according to claim 1, wherein
the background image for use in the extraction is not to be updated in a case where a proportion of the foreground image to the processing image is larger than a predetermined threshold.

4. The image processing apparatus according to claim 3, wherein
the background image is to be updated in a case where the proportion of the foreground image to the processing image is smaller than the predetermined threshold.

5. The image processing apparatus according to claim 1, wherein
the background image for use in the extraction is not to be updated in a case where a percentage of pixels in the processing image that are determined as background is lower than a predetermined percentage.

6. The image processing apparatus according to claim 5, wherein
the background image for use in the extraction is to be updated in a case where the percentage of the pixels in the processing image that are determined as background is higher than the predetermined percentage.

7. The image processing apparatus according to claim 1, wherein
the background image for use in the extraction is not to be updated in a case where a proportion of the foreground image to the processing image is larger than a predetermined threshold or a percentage of pixels in the processing image that are determined as background is lower than a predetermined percentage.

8. The image processing apparatus according to claim 7, wherein
the background image for use in the extraction is to be updated in a case where the proportion of the foreground image to the processing image is smaller than the predetermined threshold and the percentage of the pixels in the processing image that are determined as background is higher than the predetermined percentage.

9. The image processing apparatus according to claim 1, wherein
the background image for use in the extraction is to be updated in a case where the object is motionless or not extractable as the foreground image by the extraction.

10. A non-transitory computer readable storage medium storing a program for causing a computer to function as an image processing apparatus, the image processing apparatus comprising:
one or more memories storing instructions; and
one or more processors executing the instructions to:
extract a foreground image corresponding to an object included in a processing image using a background image corresponding to the processing image;
generate a background image from the processing image;
receive a user operation to set as to whether to update the background image for use in the extraction from a user interface;
update, for each of a predetermined plurality of frames, the background image for use in the extraction using the generated background image and not to update the background image for use in the extraction at frames not corresponding to the predetermined plurality of frames; and
stop updating the background image for use in the extraction in a case where the background image for use in the extraction is set not to be updated by the received user operation.

11. A image processing method comprising:
extracting a foreground image corresponding to an object included in a processing image using a background image corresponding to the processing image;
generating a background image from the processing image;
receive a user operation to set as to whether to update the background image for use in the extraction from a user interface;
updating, for each of a predetermined plurality of frames the background image for use in the extracting using the generated background image in the generating and not updating the background image for use in the extraction at frames not corresponding to the predetermined plurality of frames; and
stop updating the background image for use in the extraction in a case where the background image for use in the extraction is set not to be updated by the received user operation.

* * * * *